Dec. 26, 1933.　　E. F. HATHAWAY ET AL　　1,941,086
MECHANISM FOR AND METHOD OF PREPARING TUFTING YARNS
Filed May 15, 1930　　8 Sheets-Sheet 1
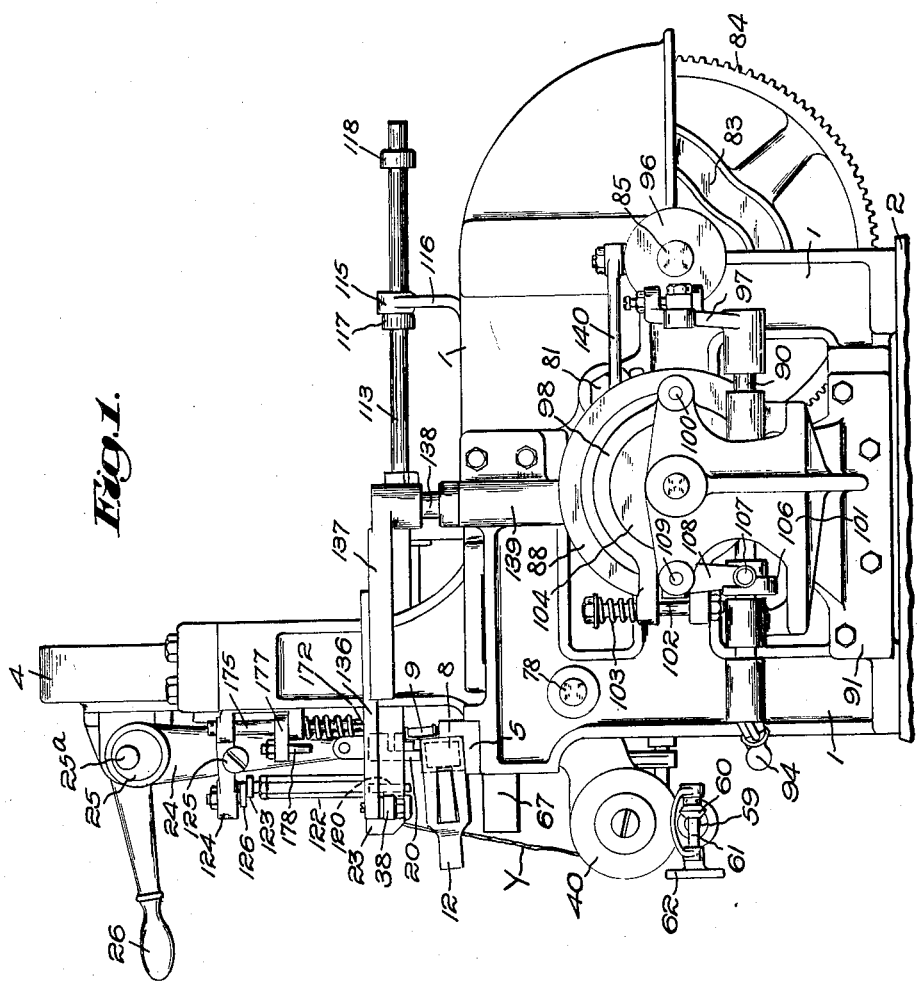
Inventors:
Edgar F. Hathaway
Walter Bixby
by Emery, Booth, Varney & Townsend
Att'ys

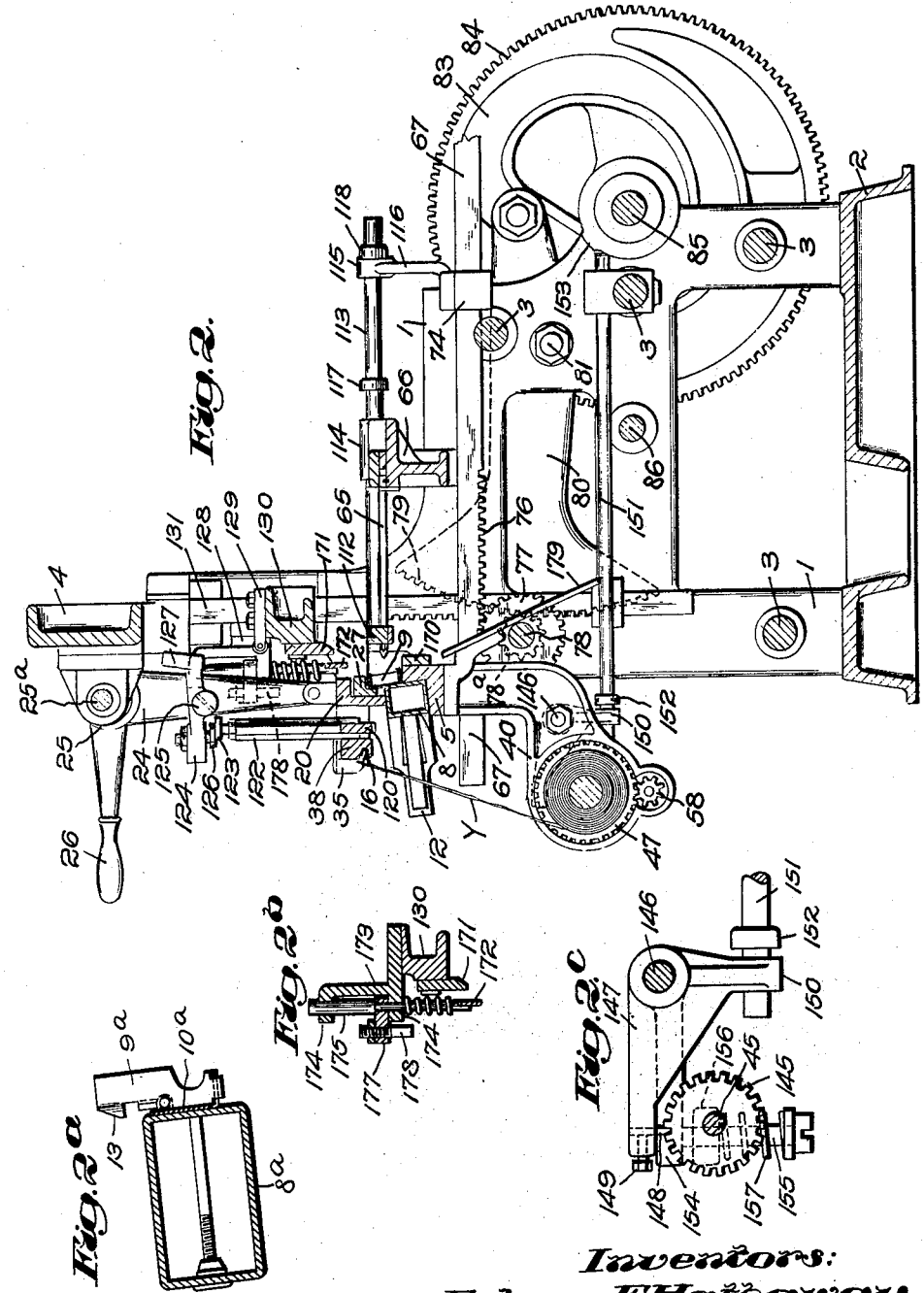

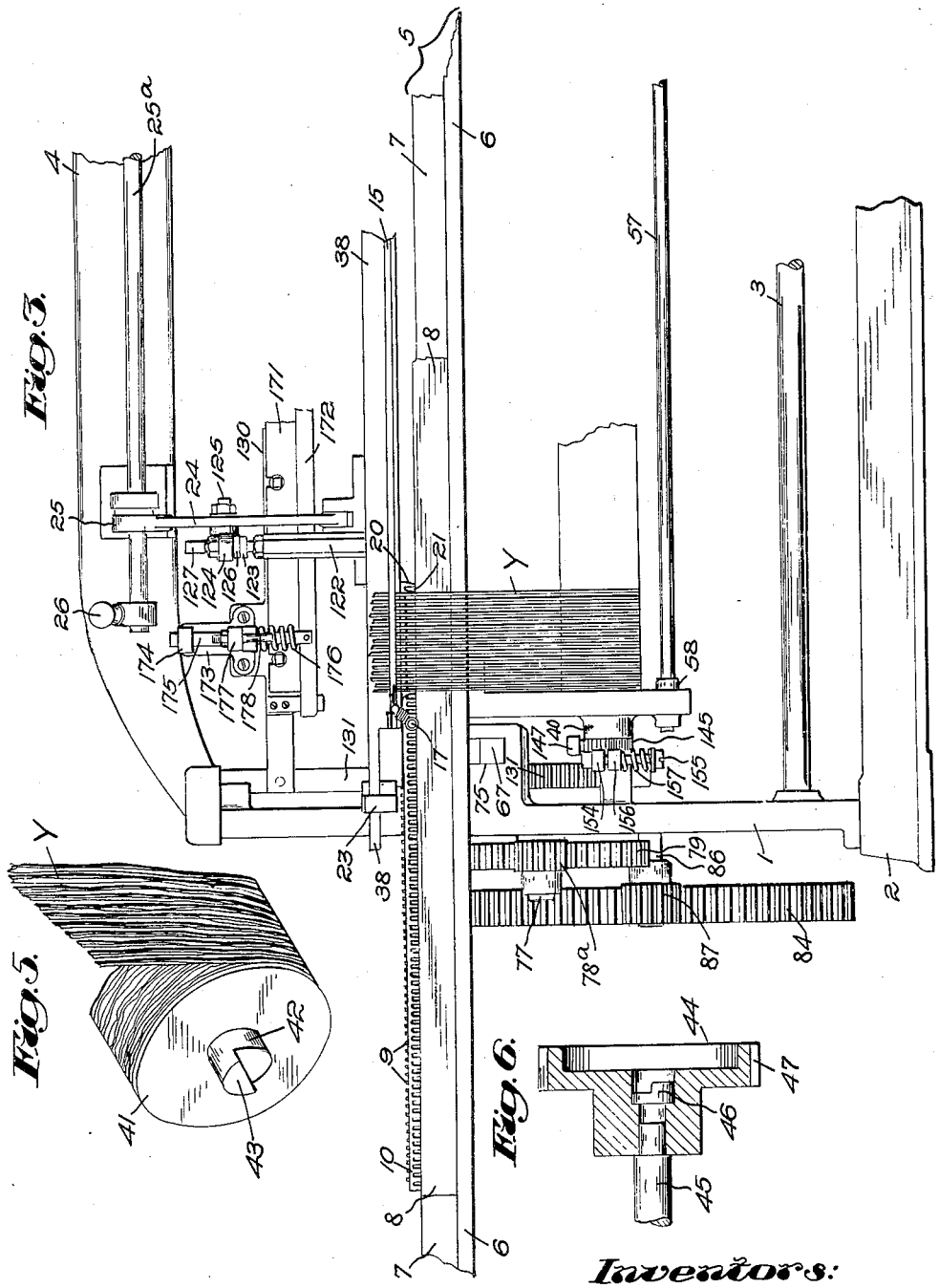

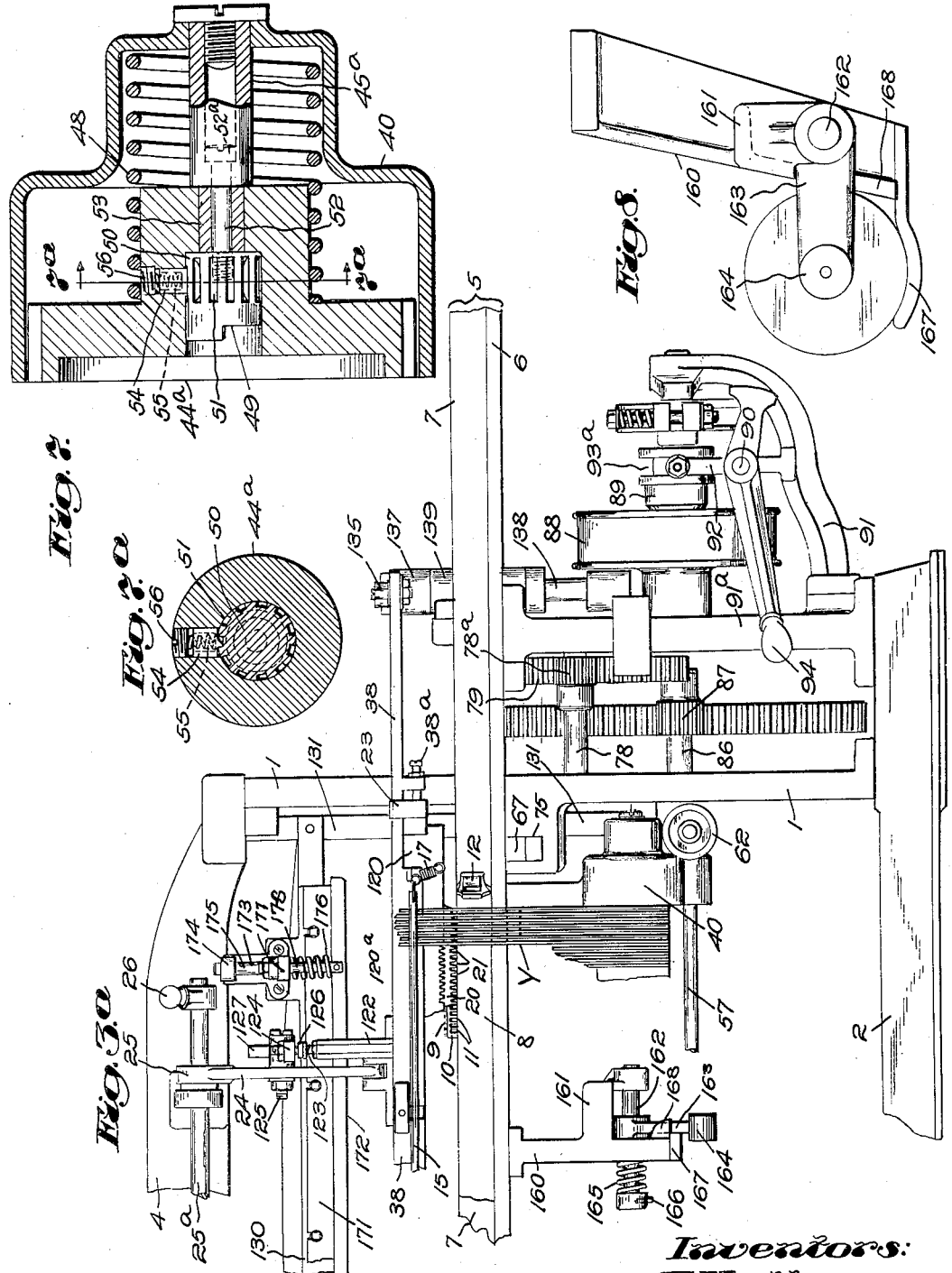

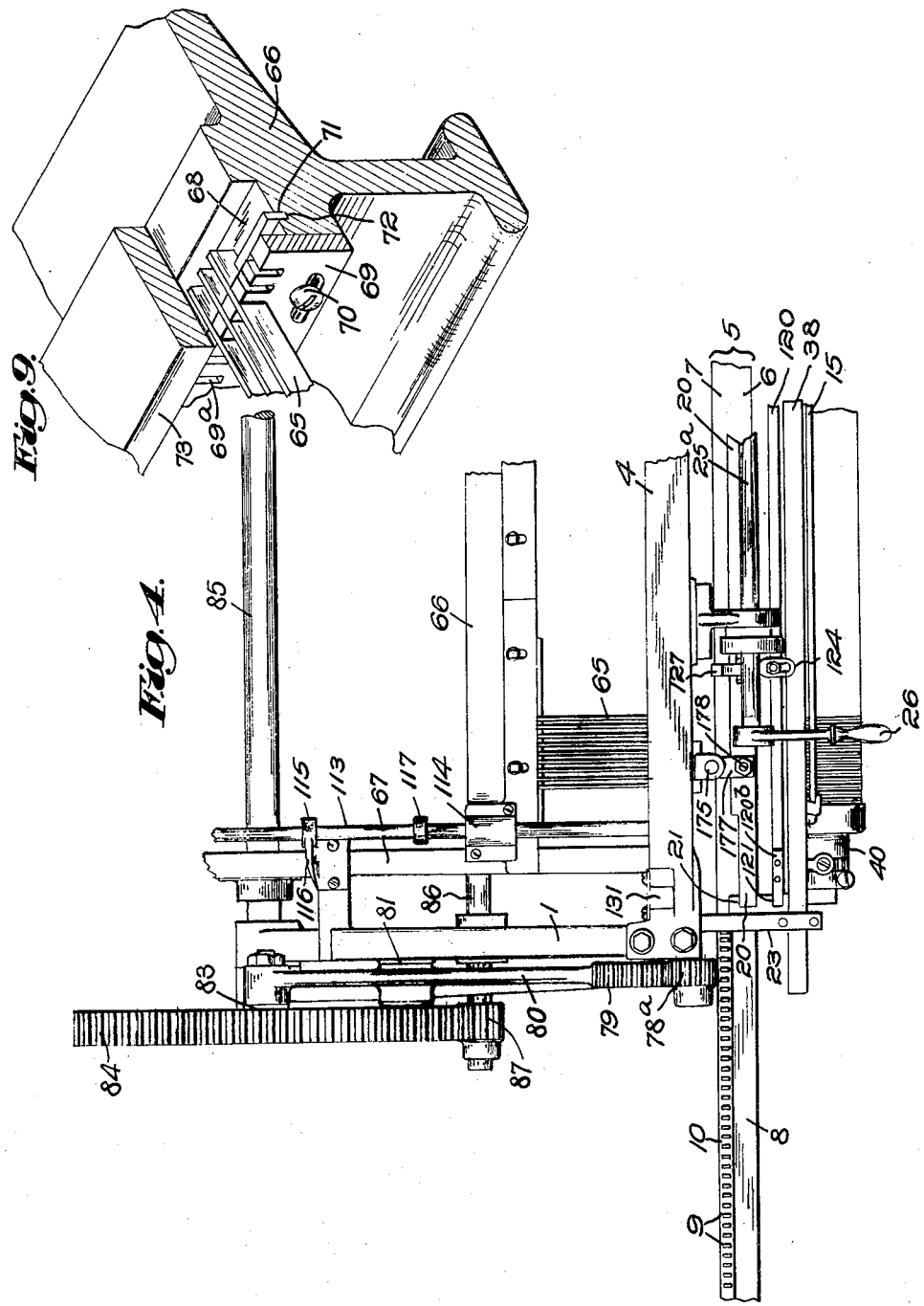

Dec. 26, 1933.     E. F. HATHAWAY ET AL     1,941,086
MECHANISM FOR AND METHOD OF PREPARING TUFTING YARNS
Filed May 15, 1930     8 Sheets-Sheet 6
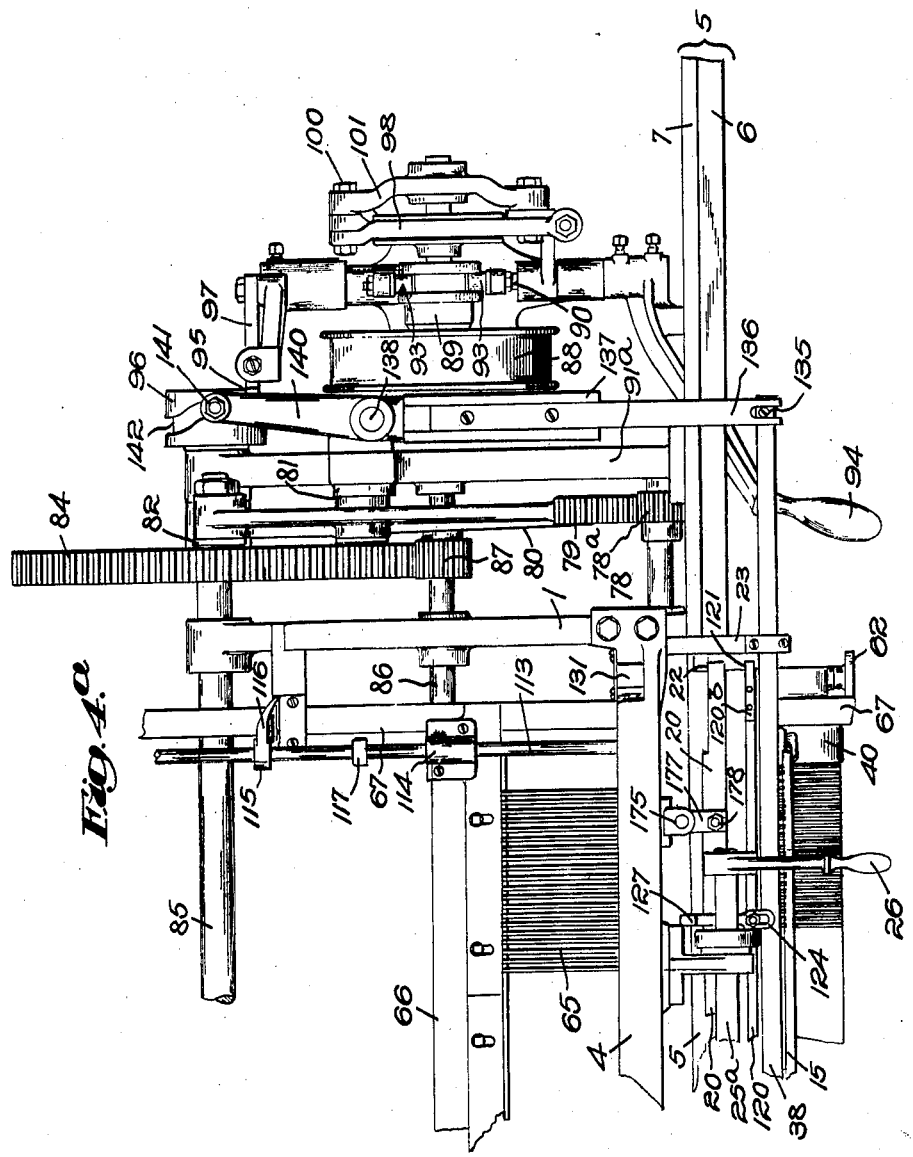
Inventors:
Edgar F. Hathaway
Walter Bixby
by Emery, Booth, Varney & Townsend
Attys

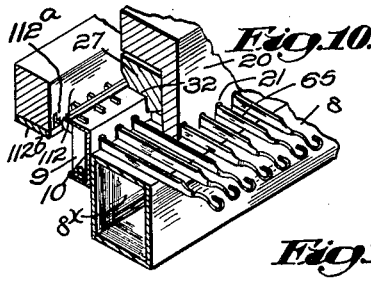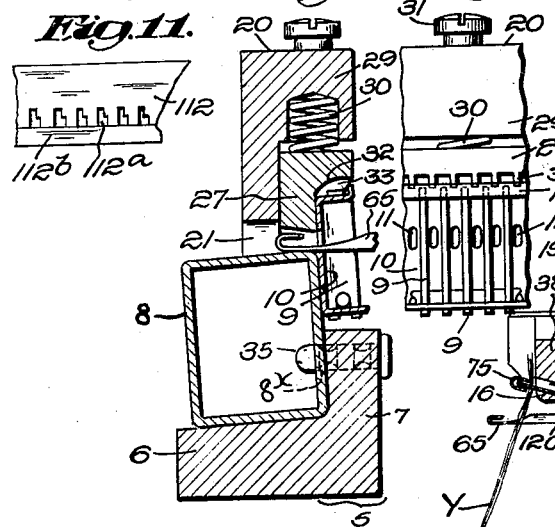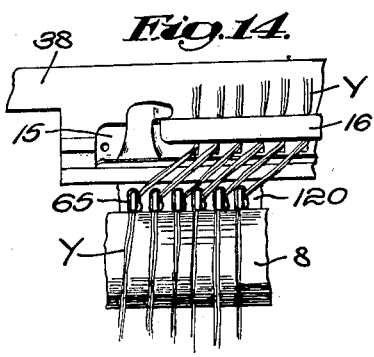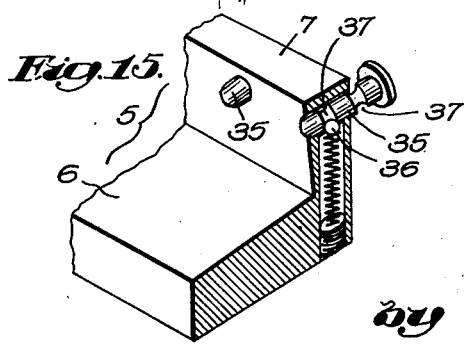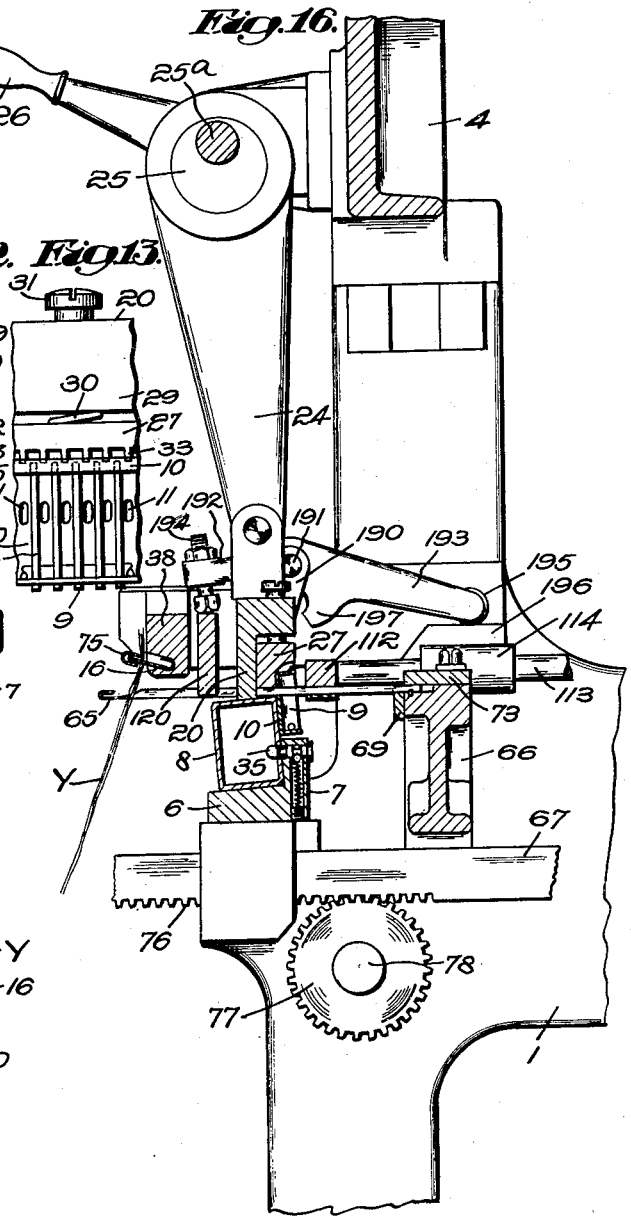

Dec. 26, 1933.    E. F. HATHAWAY ET AL    1,941,086
MECHANISM FOR AND METHOD OF PREPARING TUFTING YARNS
Filed May 15, 1930    8 Sheets-Sheet 8
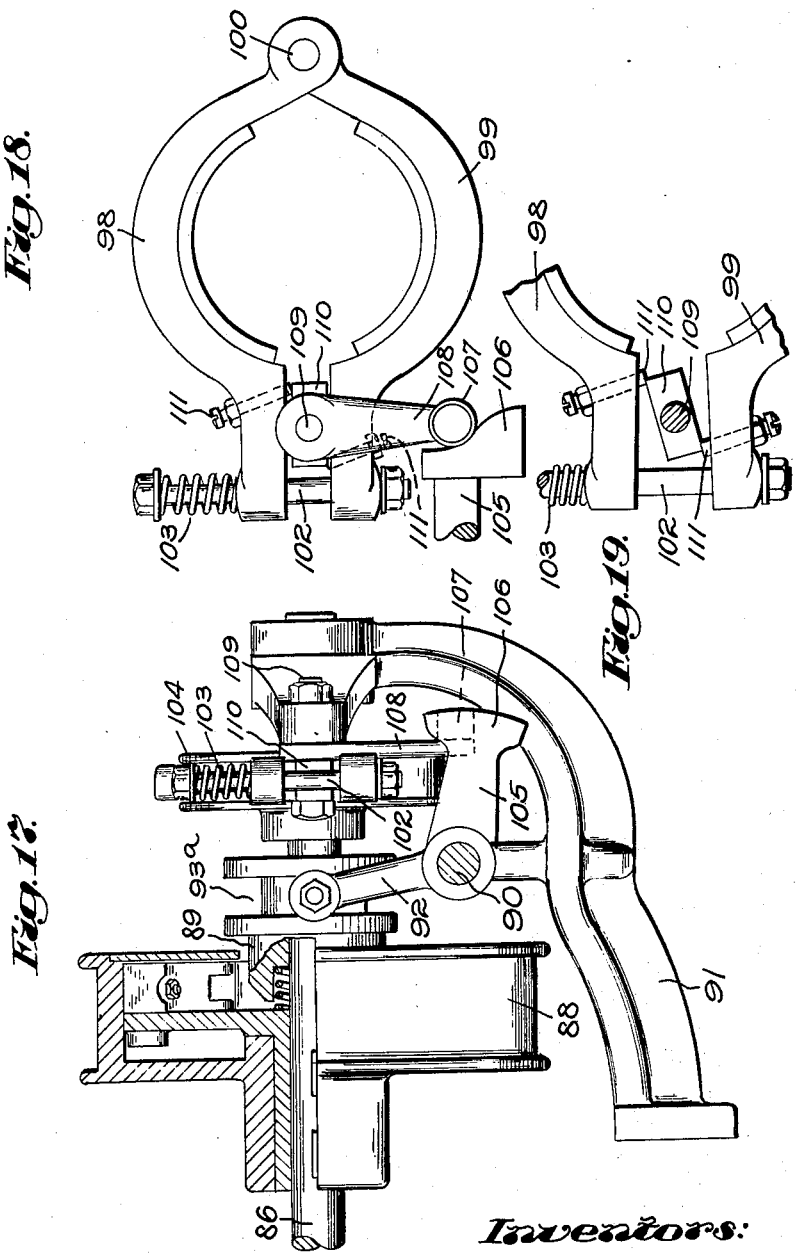
Inventors:
Edgar F. Hathaway
Walter Bixby
by Emery, Booth, Varney & Townsend
Attys Patented Dec. 26, 1933

1,941,086

UNITED STATES PATENT OFFICE

1,941,086

MECHANISM FOR AND METHOD OF PREPARING TUFTING YARNS

Edgar F. Hathaway, Wellesley, and Walter Bixby, Dorchester, Mass., assignors to Shawmut Engineering Company, Dorchester, Mass., a corporation of Massachusetts Application May 15, 1930. Serial No. 452,655

25 Claims. (Cl. 28—56)

The present invention relates to the art of weaving tufted or pile fabric, such as Axminster and other carpets; more particularly it aims to provide improved mechanism for and methods of preparing series of tufting yarns for storage and transportation, and for use in looms.

In weaving tufted fabrics, and particularly carpets, the yarns which are to provide the tufts or pile are spooled, with the yarns or yarn units of the various spools arranged in accordance with the pattern requirements. The wound tufting spools are commonly supported on yarn carriers or frames, or so-called "tube-frames", with the yarn ends held in proper spaced relation by suitable yarn guides or "tubes" on the carrier. These yarn carriers or "tube-frames", each with its tufting spool or spools, are attached to a conveyer or pattern chain of a loom and are successively brought to operative position. In the greater number of looms each yarn carrier as presented is taken bodily from the conveyer, carried down into the loom to insert the projecting ends of the tuft yarns directly into the warp, and is then replaced on the conveyer. But in other looms, which we will refer to as Servian looms, the yarn carriers or frames are not taken bodily from the conveyer. These latter looms have yarn engaging devices of grippers which seize the ends of the yarns of a presented yarn carrier while the latter is still upon the conveyer, draw off sufficient length of yarn, and present it to the warp.

While the present invention in many of its aspects is equally applicable to the preparation and placing of tufting yarns in the guides of yarn carriers or "tube-frames" for any tufted fabric loom, it is illustrated in connection with yarn carriers of the Servian loom type, and in many respects it is especially adapted thereto.

Fig. 1 is a right-end elevation of one form of mechanism in accordance with the invention;

Fig. 2 is a vertical section through the machine of Fig. 1;

Fig. 2a is an enlarged section through a yarn carrier or frame;

Fig. 2b is a detail view in vertical section illustrating certain yarn clamping means of Figs. 1 and 2;

Fig. 2c shows in elevation and on a large scale a spool-holding and release device seen in Figs. 2 and 3;

Figs. 3 and 3a, are front elevations showing respectively the left-hand and right-hand portions of the machine of Figs. 1 and 2;

Figs. 4 and 4a, are plan views corresponding to Figs. 3 and 3a.

Fig. 5 is a perspective upon a larger scale of one end of a tufting spool;

Fig. 6 is a section through one of the spool holders or cups;

Fig. 7 is a view similar to Fig. 6 but upon a still larger scale showing a spool holder or cup used in opposition to that of Fig. 6;

Fig. 7a is a section on the line 7a—7a of Fig. 7;

Fig. 8 is an end elevation of an auxiliary spool holder seen also in Fig. 3a;

Fig. 9 is a perspective view upon an enlarged scale and with parts in vertical section of a portion of the needle carriage;

Fig. 10 similarly illustrates a portion of a yarn carrier in position on the machine and with the bank of needles in forward position;

Fig. 11 is a front elevation of a portion of the rear needle guide;

Fig. 12 is a vertical cross-section, on a large scale, through the yarn carrier support and clamp, with a carrier in clamped position;

Fig. 13 is an elevation corresponding to Fig. 12 as viewed from the right in said figure;

Fig. 14 is a front elevation of a portion of the yarn comb holder and associated yarn carrier in threading position;

Fig. 15 is a vertical sectional view in perspective of the yarn carrier support;

Fig. 16 is a vertical section corresponding to the upper left portion of Fig. 2, upon a larger scale, and showing a modified form of mechanism also embodying the invention;

Fig. 17 is a front elevation, with parts in vertical section, of the power receiving and brake mechanism;

Fig. 18 is an end elevation of the brake of Fig. 17; and

Fig. 19 is a view corresponding to a portion of Fig. 18 but illustrating the released position of the brake.

Referring first to Figs. 1 to 4a, the mechanism as a whole is mounted in suitable framing, including the side or end frames 1 on a base 2 and rigidly connected as by longitudinal ties 3, four of which appear in section in Fig. 2. The side frames 1 have upward extensions at the front of the machine, which support the top member or arch 4.

At a convenient height along the machine front is the yarn carrier or frame support 5. It includes a bottom portion or platform 6, preferably inclined upwardly and rearwardly as seen in Figs. 1 and 2, to receive the then under face of a yarn carrier to be threaded, and a rear wall 7, against which the inner face of the carrier is abutted. This carrier support is preferably of a length to receive and hold carriers of maximum width, including those for a plurality of aligned spools, such as used in "wide" work.

The carrier support and associated means to be described are herein particularly constructed and arranged for cooperation in a novel manner with yarn carriers for Servian looms. One such carrier is seen in section in Figs. 2 and 12, in detail in Fig. 10, portions appearing also in Figs. 3 and 3a, and Fig. 4. It comprises the carrier proper or frame 8, herein an elongated member or bar illustrated as a hollow tube, but which may be otherwise formed. Along one face of this carrier bar is a series of barriers or guides 9 secured in an attaching element or strip 10, the latter having yarn receiving and guiding slots or apertures 11 between the individual barriers; see also Fig. 13. This carrier is similar to that of the patent to Bixby and Lea No. 1,590,169, dated June 22, 1926. At its ends are suspension means or "ears" 12 for attaching it to the pattern chain of a loom, suitable bearings for the yarn spool journals being provided in conjunction with the ears, and in the case of "wide" frames, at intermediate points along the carrier.

Another form of carrier with which the mechanism and methods of our present invention are particularly useful is shown in section in Fig. 2a, being similar to those disclosed and claimed in the copending Hathaway applications Serial Nos. 290,916 and 317,728. It includes the carrier or main frame 8a along which are the barriers or guides 9a secured by an attaching strip 10a and having yarn confining means 13 associated with them, either as deflected portions of the barriers themselves or as parts of an adjacent strip or strips. In some instances the barriers and/or the confining means may be portions of a structurally continuous element along the carrier, for example as disclosed in said copending applications.

As a first step in the practice of the present invention, the tufting yarns Y (which term throughout is intended to include yarn units, each of which may comprise two or more individual yarns or strands) are spooled or "set" on their spools, in the arrangement as required by the particular pattern to be woven, any preferred winding or spooling mechanism or so-called pattern setting frame being employed for this purpose, such for example, as that of the patent to Hall and Hathaway No. 1,752,738 dated April 1, 1930. As a succeeding step, the ends of the spooled yarns are fixed in proper order and in spaced relation as by applying to them a yarn-end clamp or transfer comb, seen in elevation in Figs. 3, 3a, 4, 4a, in section in Figs. 2 and 16 and upon a larger scale in Fig. 14. This transfer comb as illustrated by way of example comprises a slotted or toothed member or comb proper 15 and a retaining cap 16. It is secured along and against the mass of wound yarns, until such time as the spool is to be used, as by means of the spring retainers 17, see Figs. 3 and 3a, engageable over the spool journals.

The spooled yarns, with fixed or spaced ends, are then in readiness for placing in the guides of a yarn carrier preparatory to use in the loom. A carrier to which they are to be applied is positioned upon the support 5, with the guides for the yarns of any given spool in position opposite the threading instrumentalities of the machine. In the mechanism illustrated, a single-spool carrier may be threaded in one operation. With a "wide" carrier, holding a number of aligned spools, sections thereof are threaded successively, the carrier being shifted lengthwise the machine for the successive threading operations. It will be understood, however, that the machine may be of such length, with sufficient threading instrumentalities, to place all the yarns of a plurality of spools simultaneously, if desired, for example, as in our Patent No. 1,522,778, dated January 13, 1925.

Means is provided for holding or clamping the yarn carrier in proper position on its support for threading the carrier guides or the selected section thereof. A carrier clamp or bar 20 extends lengthwise the machine, and is adapted to be brought down into holding engagement with the bar or frame proper 8 of a positioned yarn carrier, substantially as in Fig. 2. The lower portion of this carrier clamp is slotted, as at 21, Figs. 3, 3a, 10 and 12, for the passage of the threading devices. It is movable between holding and releasing positions in guides 22 in forwardly projecting brackets 23 on the side frames 1; see Figs. 4 and 4a. Depending from the arch 4 are arms 24 pivotally attached to the carrier clamp at their lower ends and operable to lock or release it, as by adjustable eccentric mechanism 25, the operating shaft 25a and one of the hand levers 26, substantially as in our Patent No. 1,512,928, dated October 28, 1924.

Novel means is herein provided to assist in holding and properly aligning the yarn-receiving guides of the carrier. As best seen in Figs. 10, 12 and 13, and also in Fig. 2, a longitudinal strip, or auxiliary clamp 27 is positioned at the rear face of the main clamp, being yieldably carried below an overlying portion 29 of the latter. Springs 30 are provided between the main and auxiliary clamping elements, the tension of which may be regulated as by the adjusting screws 31. The lower portion of this auxiliary yieldable clamp is adapted to contact and reinforce the adjacent portion of the attaching strip 10 of the supported yarn carrier. It is recessed along its rear face, as at 32, to set over the tops of the carrier guides or barriers 9. Along the upper wall of this recess is a rack or comb 33, the individual members of which are arranged to enter between the upwardly extending ends of said barriers. Thus the yarn-receiving apertures or slots of the carrier, and the inter-barrier spaces are brought into proper and accurate alignment, and the entire series of barriers is firmly held and positioned with extreme accuracy.

The yarn carrier 8 is definitely located in proper position lengthwise its support 5 prior to clamping it. Referring to Figs. 12 and 15, we have provided for this purpose releasable stop means engageable in openings or recesses 8x in the adjacent wall of the carrier. These openings are later utilized in the loom to assist in holding the carrier while the loom grippers are engaging and drawing out the yarns. Each such stop means, as illustrated, comprises a pin 35 slidable in the rear wall 7 of the carrier support and held in operative or inoperatitve position as by means of a spring-pressed ball detent 36 engageable in either of two annular grooves 37 in the pin. To enable the machine to handle carriers in which the positioning apertures 8x may be differently located, because of difference in looms, alternate stops or series of stops are desirably provided, as shown in Fig. 15. It is then necessary merely to withdraw one series of stops 35 and project another to adapt the machine for use with the differing carriers.

Assuming now that a yarn carrier has been positioned and clamped on its support 5 in readiness for threading, the yarn spool to be threaded is placed in spool holding means on the machine, and the transfer comb 15 which spaces the yarn ends is set into a comb holder 38 supported in the forwardly projecting brackets 23 on the side frames, thus positioning the yarns in extended and spaced relation for cooperation with the threading instrumentalities.

The spool holding means referred to comprises a pair of oppositely disposed cups adapted to receive the spool heads and rotatably supported in brackets 40 hung below the carrier support. The cups at opposite ends of the spool may be generally similar, but at least one of them is axially yieldable to permit the insertion of a spool. In the present instance we have shown spool-holding cups particularly adapted for use with a novel form of spool such as illustrated at 41 in Fig. 5. As there shown, the spool journals 42 are formed with an interlocking portion 43 adapted to cooperate with a like formation on the journal of the next adjacent spool on a carrier for "wide" work.

The internal parts of one spool holder, that herein at the left of the machine, are shown in section in Fig. 6. These comprise the cup 44 having an axial stub shaft 45 whereby it is rotatably supported in its bracket 40. The cup is socketed at its inner face to receive a spool journal and has set into it a socket piece 46 to interlock with the corresponding formation 43 on a spool journal. On the periphery of the spool cup are gear teeth 47 for the purpose to be described. This spool-holding cup of Fig. 6, while itself rotatable, holds the received spool head against rotation in either direction within the cup.

The spool holder for the opposite end of the spool, herein that at the right side of the machine as viewed in Fig. 3a, is shown in section and upon a larger scale in Fig. 7. It likewise comprises a cup 44a and axial shaft 45a. This cup as a whole is yieldable axially but is normally urged toward the opposing cup by a coil spring 48 bearing between the cup and the surrounding housing portion of the cup bracket 40. It will be understood that because of the interlocking formations on the spool journals, which may not always be similarly angularly positioned, it may at times be necessary to shift the journal-receiving portions of the two cups relatively to each other in order to seat the spool journals properly in the cups, or else to similarly adjust the cups bodily. To facilitate this insertion of the spool, we have made the journal socket of one cup, herein that of Fig. 7, itself adjustable rotatably, so that the necessity of turning the cup bodily is avoided.

Referring to Figs. 7 and 7a this spool journal-socket comprises the journal-receiving or socket portion proper 49 and a hub 50 with radial slots or ratchet formations 51. A pin 52 fixed in the inner end of the socket hub 50 extends rotatably through a bearing 53 and into the hollow inner end of the cup shaft 45a, within which it can turn but is held lengthwise by its head 52a. The cup 44a is radially recessed to receive a pawl 54, normally pressed into engagement with the ratchet slots 51 of the journal socket hub by a spring 55 intermediate the pawl and a nut 56. Said pawl together with the slot formations in the socket constitute a latch means permitting the journal socket to turn in one direction in and relatively to the cup but holding it in the opposite direction. A spool journal accordingly may be set into this ratchet socket and the spool and socket may be turned in one direction in the cup to any extent necessary to bring the opposite journal into interlocking engagement with the socket of the other cup, that of Fig. 6.

The yarn spools may be over-wound, as illustrated in Figs. 2 and 3a, or sometimes may be oppositely or under-wound, in which case the yarns would lead off from the opposite or inner face of the spool as viewed in Fig. 2, so that in drawing off the yarns the spool must turn oppositely, that is, counterclockwise in said figure. Accordingly the pawl 54 for the journal socket of the cup of Fig. 7 is made reversible. To shift it for cooperation with one or the other type of winding, it is merely necessary to remove the spring-retaining nut 56, and withdraw and replace the pawl in reverse position.

The opposed spool holders are desirably geared together through an adjusting shaft 57, Figs. 3 and 3a, having bearings at its opposite ends in depending portions of the cup brackets and carrying pinions 58, see Fig. 2, meshing with the gear teeth 47 on the respective cups 44 and 44a. At one end of the adjusting shaft, herein that at the right of the machine, see particularly Fig. 1, is a bevel gear 59 meshing with a like gear 60 on a short shaft 61 journaled in a projecting portion of the spool bracket, and having at its outer end a hand-wheel 62, whereby the spool-holding cups may be simultaneously turned to take up any slack in the yarns.

Assuming that a yarn carrier is positioned and clamped upon its support and that the spool to be threaded is placed in the spool holders, with the transfer comb set in its holder, thus holding the yarn ends extended as in Fig. 2, the series of yarns is then ready for engagement by the threading or yarn-laying instrumentalities. These comprise a reciprocable bank of needles or yarn engaging devices 65, Figs. 2, 4, 4a, 10 and 12, mounted on a needle bar or carriage 66, extending between and secured to the needle slides or rack bars 67.

Improved means is herein provided for removably securing the bank of needles to their carriage. As best seen in Fig. 9, the needle bar or carriage proper 66 is channeled along its upper forward portion to provide a seat 68 for the inner or rear ends of the needles 65. Along the front face of the adjacent portion of the needle bar is a removable needle-holding and spacing strip 69, adjustably secured as by means of the screw and slot connections indicated at 70. The upper edge of this strip is slotted as at 69a at proper intervals to receive and space the needles. To the rear of said adjustable strip the bottom wall of the needle seat 68 is longitudinally slotted as at 71. A key 72 is received partly in said slot and partly in aligned notches in the lower edges of the needles. The latter are thus positioned transversely by the removable needle strip 69, and are locked by the key 72 against shifting in the direction of their lengths. They are also held against vertical movement on the carriage by the removable cap piece 73.

The needle carriage 66 is reciprocable to project the needles between the barriers 9 of the carrier and through the yarn guides 11, into engagement with the yarns, and to retract the needles with the engaged yarns, thus threading the latter through or placing them in the respective guides. The needle rack bars 67 move in spaced guides 74 and 75 on the side frames; see Figs. 2 and 3, 3a. The racks 76 on the under faces of these bars mesh with gears 77 on a counter-shaft 78 extending across the machine and having at its opposite ends pinions 78a driven by segment gears 79 on arms 80 mounted for vertical rocking movement on the side frames, as at 81. Each segment arm 80 has a cam roll 82, Fig. 4a, at its rear end engaging with a track cam 83, Fig. 2, on the large cam gears 84 on the cam shaft 85 and driven from the main shaft 86 by gears 87 thereon. Power is applied to the main shaft in any suitable manner, as by the clutch pulley 88, Figs. 3a, 4a and 17, illustrated as of the expanding type wherein a clutch-operating member or cone 89 is shifted to clutch the pulley or to let it run free. A starting shaft 90, extending from front to rear of the machine, is rockably supported in bearings on the end bracket 91 which projects from the end upright 91a. It is operatively connected with the clutch cone 89 as by the upwardly extending yoke 92 on the shaft, having opposed rolls 93 at its upper end engaging in the annular groove 93a in the clutch cone. A hand lever 94 is secured to the starting shaft.

The machine is preferably automatically stopped at the end of each operating cycle through suitable mechanism, herein including a cam lug 95, Figs. 1 and 4a on the end face of a drum cam 96 on the cam shaft 85 and engageable with the adjustable stop arm 97 projecting from the starting shaft, turning the latter reversely, to throw out the clutch.

It is desirable that the needle mechanism and other parts of the machine be stopped abruptly, without over-running. Accordingly we have provided automatic brake mechanism, seen in Figs. 1, 3a and 4a and in detail in Figs. 17 and 18, comprising upper and lower brake shoes 98, 99, oppositely movable on a stud 100 fixed in the brake bracket 101. A post 102 secured to the free end of the lower shoe extends up through the upper shoe and through a spring 103 which bears between the upper shoe and the head of the post. Thus the shoes are normally forced together and into braking relation with the brake drum 104 on the main shaft.

Projecting from the starting shaft 90 is a cam arm 105 having a cam portion 106 cooperating with a roll 107 at the end of a finger 108 on a pin 109 rockable in a bearing in an adjacent portion of the brake bracket 101. On said pin is fixed a block or spreader 110, lying between the free end portions of the two brake shoes and oppositely engageable therewith, preferably through adjustable abutments or stops 111.

In Fig. 18 the brake is seen in applied position, as when the machine is at rest. When the hand lever 94 is depressed to start the machine, turning the starting shaft counterclockwise, Figs. 3a and 17, the cam arm 105 is moved up, forcing the finger 108 to the right in Fig. 18 and turning the block 110 to separate the brake shoes and release the brake drum, as seen in Fig. 19. In stopping the machine a reverse operation takes place, the cam portion 106 of the arm 105 being automatically moved away from the finger 108, permitting the block to return to the position of Fig. 18, whereby the brake shoes are forceably applied by their operating spring, quickly bringing all parts of the mechanism to rest.

Referring again to the needle mechanism, and particularly Figs. 1, 2, 4 and 4a, the needles 65 are guided in their forward and retracting movement by a rear needle guide 112, Figs. 2, 10 and 11, extending the length of the needle bank and having guide-openings 112a for the passage of the needles. These guide openings are preferably formed as slots in the bottom face of this needle guide and closed by the detachable bottom piece 112b. It is supported for movement relative to the needles lengthwise the latter, at times travelling with them but at other times being held to permit the needles to advance or retract with respect to the guide. At its opposite ends are guide rods 113 slidable in sleeve bearings 114 on the needle carriage and in collars 115 on fixed brackets 116. Front and rear stops 117, 118 on the guide rods limit their movement in both directions.

As the needles come forward, the rear needle guide 112 at first moves with them, due to the frictional engagement of the guide rods in their bearings, which may be assisted by spring-pressed detents if desired, until the rear stops 118 on the guide rods bring up against the stationary collars 115. Further forward movement of this needle guide is thus halted, substantially as in Fig. 2, while the needle carriage and the needles themselves continue forwardly into and through the guides 11 of the yarn carrier. As seen in Fig. 2, the barriers 9 of the supported carrier extend across the plane of needle movement; they are preferably inclined to the vertical, substantially as shown, whereby any slightly deflected needle will tend to be cammed into line with its yarn passage between the adjacent barriers.

Desirably the needles are also guided and accurately spaced and positioned relatively to the yarns, at the front of the positioned yarn carrier, as they emerge beyond the yarn guides and pass forwardly between the extended yarns. To facilitate the insertion and withdrawal of the yarn carriers from the machine, this front needle guide means is desirably normally out of the plane of a supported carrier and of the needle path. As illustrated, it comprises a strip or bar 120 slotted from front to rear along its lower edge to provide teeth or guide portions 120a to project downwardly between and properly space and guide the leading portions of the needles. It is vertically movable in guide bearings 121 in the previously mentioned brackets 23 projecting forwardly from the side frames but is normally held in inoperative or raised position by suitable spring means 120b, seen in Figs. 4 and 4a.

Means is provided for moving this front needle guide 120 into active or down position, for cooperation with the needles as they approach and pass the yarns. For this purpose upright posts 122 are mounted on the guide, desirably having adjustable tappets 123 at their upper ends. At the proper time these posts are pushed down to lower the front needle guide, as by depressor fingers 124 pivotally supported at 125 on the carrier clamp arms 24. The actual engagement is preferably through adjustable tappets 126 at the fore ends of the depressor fingers, similar, but positioned oppositely, to those at the tops of the posts. The depressor fingers extend rearwardly beyond their pivots and have cam pieces 127, see particularly Fig. 2, adapted to be engaged by rollers 128 on supports 129 fixed to a vertically movable bar 130 which serves also as the knife carriage, to be described.

This bar 130, as best seen in Figs. 3 and 3a, is attached at its opposite ends to the vertical racks or knife slides 131 moving in suitable guides in the machine frame, see Figs. 4 and 4a, and meshing with pinions on the counter shaft 78 previously referred to. The parts are so related and timed that the rollers 128 on the vertically moving bar 130 make contact with the cam pieces 127 of the depressor fingers 124, thereby to lower the front needle guide 120, as the needles are emerging at the front of the yarn carrier.

When the needles have been projected sufficiently to carry their bights through between the supported yarn ends, the yarns and needles are moved relatively to each other, in the direction lengthwise the spool, to lay the yarns across the needles. In the present instance this is effected by shifting the yarns. The transfer comb holder 38 previously referred to is movable longitudinally in the forwardly projecting brackets 23 on the machine side frames. At one end of the machine, herein the right, see Figs. 3a and 4a, this transfer comb holder is extended and pivotally connected, as by the pin and slot connection indicated at 135, with the adjustable forward end 136 of the holder shifting lever 137. The latter is fixed at the upper end of a vertical rock-shaft 138 in a sleeve bearing 139 on the adjacent side frame; see also Fig. 1.

At the lower end of said vertical shaft 139 is fixed a second arm 140, Figs. 1 and 4a, having at its rear end a cam roll 141 cooperating with a cam groove 142 in the drum cam 96 previously referred to, on the adjacent end of the cam shaft 85. This cam 96 is timed to effect the necessary slight longitudinal shifting movement of the comb holder just before the needles start to retract. The threading position of the comb holder may be accurately determined by an adjustable stop 38a on the holder, Fig. 3a, and abutting the side face of the adjacent bracket 23.

The spool holders and spool supported therein are preferably normally held against rotation, to prevent undue slackness in the extended yarns, but as the needles retract to carry the yarn ends with them through the carrier guides, the spool holding means should be released momentarily to allow a sufficient length of yarn to unwind. Accordingly one or both of the spool holders, herein that at the left of the machine, Figs. 2, 2c, 3 and 4, is equipped with a ratchet 145 fixed on the cup shaft 45; compare Fig. 6. On the adjacent spool holder bracket 40 there is pivoted as at 146, Figs. 2 and 2c, a two-arm lever including a forwardly extending arm 147 having a pawl 148 removably attached to its forward end, as by a set screw 149, and engageable with the ratchet 145. The other and downwardly extending arm 150 of said two-arm lever slidably receives the forward end of a reciprocable push rod 151 on which is an adjustable collar 152 adapted to abut the depending arm 150 and move it forwardly, thus lifting the pawl 148 out of engagement with the ratchet and leaving the spool holding cups free to turn, together with their supported spool. Said forward movement of the push rod is effected at the proper time by any suitable means such as the cam 153, Fig. 2, adjustably fixed on the cam shaft 85. To accommodate spools wound either as shown in Fig. 2, or in the opposite direction, the pawl and ratchet mechanism is made reversible, so that when a reversely or "underwound" spool is to be handled it is merely necessary to loosen and reverse the pawl 148 on its arm 147.

The pawl is normally yieldingly urged into engagement with the ratchet by suitable spring means, such as seen in Figs. 2c and 3. The pawl-carrying arm 147 has along one side a finger 154, fixed with respect to the arm but movable therewith, and having a depending post 155 extending down through a stationary collar 156 on the adjacent side frame. A coil spring 157 surrounds the lower end of the post 155 and bears between the under face of said stationary collar 156 and a head at the bottom of the post, thus acting to draw the latter and the pawl-carrying arm 147 downwardly into operative position.

Desirably the threading machine is constructed to handle different standard length spools. For example, the spool holders previously described may be located and arranged to receive "four-quarter" spools, that is, a spool holding a 36-inch yarn mass (four quarters of a yard). In such case an auxiliary spool holder may be provided for receiving one end of a "three-quarter" spool, the other end being positioned in one of the holders of the pair already described.

One such auxiliary holder is illustrated in Figs. 3a and 8. It is located to receive the right end of a shorter spool such as referred to, being then used in lieu of the other holder at that end of the machine. In Fig. 3a this auxiliary holder is in inactive position, but in Fig. 8 it is shown ready to receive a spool. As illustrated it comprises a bracket or casting 160 depending from the yarn carrier support 5 and having a yoke-like portion 161 in which are aligned bearings for a pin 162. An arm 163 is fixed on said pin and has a socket 164 at its outer end to receive the spool journal.

The pin 162 is both rockable and slidable in its bearings, being urged toward the left in Fig. 3a and also placed under torsion by a spring 165 surrounding the extended portion of the pin, between the bracket and the pin head. One end of the spring is anchored by a stud 166 on the pin, while the other end is made fast in the bracket, being secured therein under torsion so as to urge the socketed arm 163 upwardly into the position shown in Fig. 8. This upward movement of the arm is limited by its engagement with the transversely extending part of the bracket yoke 161. At the lower end of the bracket is a cupped finger 167 adapted to underlie, support and brake the spool head. At one side of the lower part of the bracket and just above the spool supporting finger is a laterally projecting and downwardly inclined cam portion 168.

When the auxiliary spool holder is not desired for use, the spool holding arm 163 is forced down along said cam portion, which forces it to the right in Fig. 3a, against the pressure of the spring. As it reaches the bottom of the cam it will snap back to the left and be held down in out-of-the-way position by the under face of the cam, as shown in said Fig. 3a. A reverse operation will instantly place this auxiliary spool support in condition for use. As soon as the spool arm 163 is moved out from below the cam, its spring will automatically bring it to operative position as in Fig. 8.

In the form of the invention as illustrated in Figs. 1 to 15, means is included for trimming the yarn ends after the needles have placed them in the respective guides of the yarn carrier. As best seen in Fig. 2, one element or fixed member 170 of the trimming or shearing means is attached to the yarn carrier support 5, immediately below the placed or drawn-in yarn ends.

A movable shear or blade 171 is adjustably secured to the vertically reciprocable knife bar 130 previously referred to, in position to cooperate with said fixed element 170. Through mechanism such as already described, the movable blade is caused to descend, at the proper time, to trim the entire series of yarn ends.

To insure an accurate and even trimming action, means is desirably included for holding or clamping the yarn ends during the shearing operation. To this end we have provided a yarn-end trimming clamp 172, Figs. 1, 2, 2b, 3 and 3a, preferably having a rounded lower edge, extending the length of the yarn series and adapted to be brought into yielding clamping engagement with the yarns. Referring to said figures, and particularly the detail Fig. 2b, yoke-like brackets 173 are mounted on the knife bar 130 at its opposite end portions. These provide upper and lower slide bearings 174 for posts 175, the depending ends of which are attached to and carry the yarn clamp 172. Surrounding each post between the clamp itself and the lower slide bearing 174 are springs 176 urging the clamp downwardly, its downward movement being limited by the enlarged upper portion of each of the posts 175. Normally the yarn clamp lies somewhat below the edge of the adjacent knife, as clearly seen in Figs. 2 and 2b. As the knife bar descends, the yarn clamp first engages and securely clamps the entire series of yarns, but, due to the described yieldable connections, the knife is permitted to descend sufficiently further to complete the trimming operation.

The automatic stop 95 of Figs. 1 and 4a, previously described in connection with the driving and brake mechanism, is so arranged, and the operating parts so timed, that the machine is stopped, after each operating cycle, in a position with the yarn ends still held by the trimming clamp. This is desirable in order that the yarn spool may then be removed from the spool holders of the machine and placed in its bearings on the yarn carrier, while the latter is still supported on the machine, without deranging the yarns.

When the spool has been so transferred, the yarn carrier is then ready for removal from the threading machine for storage or for use in a loom, in the case of a single-spool carrier, or to be shifted along the threading machine for threading of any remaining guides, in the case of a plural-spool carrier. In this connection means is herein provided for releasing the clamped yarn ends automatically with the release of the yarn carrier itself, but without the necessity of starting up the machine. Accordingly lugs 177 are secured on the yarn-clamp bearing yokes 173 so as to extend forwardly over the yarn carrier clamp 20. At their forward ends are adjustable pins or lifters 178. As a hand lever 26 is moved to elevate the yarn carrier clamp and release the yarn carrier, the upper face of the latter, then in engagement with said lifter pins 178, acts through them simultaneously to elevate the yarn-end trimming clamp 172, thus freeing both the yarn carrier itself and the yarn ends. The trimmed-off fragments of yarn drop from the needles and are preferably guided by a chute 179, Fig. 2, into a suitable receptacle.

Under some conditions it is not desirable to trim the ends of the threaded yarns automatically or in immediate connection with the threading operation. In Fig. 16, we have illustrated a modified form of mechanism which is particularly useful in such case.

Referring to said figure, parts not otherwise mentioned may be assumed to be the same as in the figures previously described. One side frame is indicated at 1 and a portion of the arch at 4. The yarn carrier 8 is positioned on its support 5 as in the previous form of the invention, where it is held by the carrier clamp 20 operated by the hand lever 26 through eccentric mechanism and vertical arms 24 as in the previous instance. The transfer comb 15, 16 is positioned in the shiftable comb holder 38, holding the yarns Y in extended and spaced relation in readiness for threading. The bank of needles 65 is mounted upon a reciprocating carriage or needle bar 66 extending between the needle slide bars 67 having racks 76 operated by gears 77 on the counter shaft 78. The rear needle guide 112 is mounted for movement relative to the needles on the guide rods 113 as in the foregoing figures.

A front needle guide 120 is provided between the carrier clamp and the supported yarns, having a normal position clear of the needle path and arranged to be brought into operative relation to the needles at the desired time. It is slidably guided at its opposite ends in the brackets 23 which support the transfer comb holder 38, as in the previous figures, and is normally elevated by suitable spring means.

In the form of the invention as in Fig. 16, the descending movement of this front needle guide is controlled by the forward movement of the needles and needle carriage. Pivoted on a stand 190 on the carrier clamp 20, as at 191, is a two-arm lever including a forward arm 192 and a rearward extension 193. The front arm carries an adjustable stud 194 overlying the needle guide 120, while the rearward extension or arm 193 is provided with a cam roll 195 cooperating with a cam 196 on the needle carriage 66. But one set of these guide-operating parts is seen in Fig. 16, but it will be understood that they may be duplicated at other points along the machine.

In Fig. 16 the front needle guide is shown in depressed or operative position, the needle carriage and the cam 196 having been advanced to forward position, wherein the cam roll 195 has moved up onto the cam, lifting the rear arm 193 and causing the forward arm 192 to depress the needle guide. As the needles are subsequently retracted, the cam 196 is withdrawn from below the roll-carrying arm, permitting the needle guide to rise under the action of its springs. Downward movement of the roll-carrying arm is limited as by a stop 197 engageable with the adjacent rear portion of the carrier clamp.

As previously pointed out, the mechanism and method of our invention are applicable in connection with yarn carriers or frames for one spool or for a plurality of spools; our mechanism and method are likewise adaptable for use in connection with a single set or bank of needles or yarn engaging instruments or with a plurality of such sets or banks operated simultaneously or otherwise.

Our invention is not limited to the particular embodiments or methods herein illustrated and/or described, its scope being pointed out in the following claims.

1. Mechanism for placing yarns in the guides of yarn carriers of the gripper-guiding barrier type, comprising a support for the carrier frame or bar, a releasable clamp engageable with the frame of a supported carrier to hold it in position, and auxiliary clamping means yieldably carried by said clamp and engageable with the barrier-supporting portion of the carrier.

2. Mechanism for placing yarns in the guides of yarn carriers of the gripper-guiding barrier type, comprising a support for the carrier frame or bar, a frame clamp, and auxiliary yieldable clamping means having spacing and holding cooperation with the individual barriers and their attaching means.

3. In yarn-carrier threading mechanism, a series of reciprocable needles, means to support a carrier of the Servian loom type in position for threading by said needles, an elongated clamp releasably engageable with the frame of a supported carrier, and a substantially coextensive toothed element along one lower edge portion of the clamp and yieldably positionable thereby with its teeth between the barriers or wall-forming elements of the supported carrier.

4. In threading mechanism, in combination with a yarn carrier having a main frame and a series of transverse barriers therealong adapted to receive yarns between them, a series of reciprocable needles, operating means therefor, and means to support the carrier in position for passage of the needles between the barriers, said means including an upwardly and rearwardly inclined platform to receive the then under face of the carrier frame, a rear wall to receive the inner face of the carrier frame, releasable positioning means to locate the carrier lengthwise its support and means to hold the carrier in supported position.

5. In a tuft-yarn threading machine, in combination with a yarn carrier having a main frame and a series of transverse barriers therealong adapted to receive yarns between them, a series of reciprocable needles, operating means therefor, a platform along the machine front to receive the then under face of the carrier to be threaded, an upright wall along the rear edge of said platform, adapted to abut the face of the carrier along which the barriers are located and with its upper face underlying the inner ends of the then substantially upright barriers, whereby said carrier is supported in position allowing the needles to be passed through between the barriers, transversely thereof, to engage and thread the yarns, and clamping means engageable over the outer ends of said substantially upright barriers.

6. In a tuft-yarn threading machine, in combination with a yarn carrier having a main frame and a series of transverse barriers therealong adapted to receive yarns between them, a series of reciprocable needles, operating means therefor, means along the machine to support said carrier with its barriers upright, across the plane of needle movement and respectively between the individual needles, and positioning and clamping means engageable with the carrier and its barriers to hold the latter in said upright threading position.

7. In yarn threading mechanism, in combination with yarn carriers having formations on a wall of their carrier bars adapted to cooperate with holding means of a loom, a carrier support, and a series of carrier positioning members on said support, movable to inoperative position or to operative position to cooperate with said formations of a carrier.

8. In yarn threading mechanism, in combination with carriers having formations on a wall of their carrier bars adapted to cooperate with holding means of a loom, a carrier support, and a plurality of series of carrier positioning members on said support selectively cooperable with carriers having said formations differently spaced therealong.

9. In yarn carrier threading mechanism, a carrier support, a bank of needles mounted to the rear of a supported carrier and reciprocable through the yarn-receiving formations thereof, a vertically movable needle guide at front of the supported carrier and normally yieldingly held out of the needle path, one or more posts on the guide, means to adjust the position of the extending ends of the posts relative to the guide, a like number of pivoted fingers each having one end portion engageable with the corresponding post, and vertically moving means engageable with the other end portions of said fingers to move the guide into the needle path as the needles are projected forwardly through the yarn-receiving formations of the carrier.

10. In yarn-carrier threading mechanism, a support for a yarn carrier, a series of needles mounted to the rear of the supported carrier for advancing and retracting with respect thereto, a needle guide bar at the carrier front and vertically movable into and out of guiding relation to the advanced needles, one or more two-arm levers each having one arm engageable with the guide bar to move the same into guiding relation, pivotal supports for said levers in a vertical plane adjacent that of the guide-bar top, cam means associated with the needles to engage the other lever arm thereby to operate said lever or levers, and stop means to limit inoperative movement of said lever or levers.

11. In a yarn carrier threading machine, in combination, a frame, a support thereon for a yarn carrier, a reciprocable bank of needles, opposed holders for the ends of a yarn spool having journals formed to interlock with those of other spools, said holders having sockets to receive said interlocking spool journals, the socket of at least one holder being rotatable relative to its holder, and said holder and socket having means for preventing such rotation in one direction.

12. In mechanism for threading yarn carriers, in combination, a frame, a bank of reciprocable needles thereon, means to support a tuft yarn spool to be drawn upon, including opposed rotatable cups for the spool heads, at least one of said cups being yieldable axially, and one of said cups having means for cooperation with an element of the spool thereby to hold the received spool head against turning in the cup in one direction but enabling it to turn therein in the other direction.

13. In mechanism for threading yarn carriers, in combination, a frame, a bank of reciprocable needles thereon, means to support a tuft yarn spool to be drawn upon, including opposed cups for the spool heads, one of said cups having a ratchet socket for a spool journal whereby the latter may be set in the socket and the spool may be turned in one direction in the cup while the cup may remain at rest.

14. In mechanism for preparing tuft yarns for use in a loom, in combination, a yarn carrier support, means to hold a series of yarn ends in extended and spaced relation, holders for the opposite ends of a spool whereon the yarns are wound, and a spool having journals at its ends, at least one of which journals has a non-circular portion, the corresponding holder being provided with a socket of like conformation as said non-circular journal portion, to hold the journal against rotation therein.

15. In a yarn carrier threading machine, in combination with a support for a yarn carrier and a yarn-end holder, opposed spool holders rotatably mounted on the machine and adapted to receive and support a spool against turning in the holders in one direction, gearing connections between the holders effective to turn them in unison and to preserve their angular relation, pawl and ratchet mechanism associated with at least one of the holders, to prevent turning thereof in a direction to unwind the spool, said mechanism including a movable pawl-carrying arm, spring means normally holding said arm in position to engage the pawl with the ratchet, a movable rod operatively engaging the pawl arm, and a cam to move said rod to release the pawl at certain times.

16. In yarn-carrier threading mechanism, in combination with a carrier support and holders for rotatably supporting the ends of a spool of given length, auxiliary spool holding means for cooperation with one of said holders similarly to support a spool of different length, said means comprising a bracket, an arm carried thereby, having a bearing for rotatably supporting a spool-journal and having a spool supporting position and an inactive position, spring means urging said arm toward one of said positions and means releasably to hold the arm in the other position against the action of the spring means.

17. In yarn-carrier threading mechanism, in combination with a carrier support and holders for rotatably supporting the ends of a spool of given length, auxiliary spool holding means for cooperation with one of said holders similarly to support a spool of different length, said means comprising a bracket, an arm pivoted thereon for movement into and out of spool-supporting position and having a bearing for rotatably supporting a spool-journal, spring and stop means tending to move the arm into and hold it in spool-supporting position, and means releasably to retain the arm, against the action of said spring, in inactive position clear of a spool received in the first-mentioned holders.

18. In a yarn-carrier threading machine, a support for a yarn carrier to be threaded, a carriage movable toward and away from said support, and a series of needles mounted on the carriage, the latter including a seat for the rear ends of the needles, a removable and adjustable spacing element on the carriage to hold the needles in the desired distribution therealong, and means to lock the needle ends in position on said seat.

19. In a yarn-carrier threading machine a yarn-carrier support and a carriage movable toward and away from said support, said carriage comprising a bar extending lengthwise the machine, a substantially coextensive strip along the bar front and removably attached to the bar, and a series of slot formations in the upper portion of the strip, each constructed and arranged to receive one of a series of threading needles to retain them in desired spaced relation.

20. In mechanism for threading yarn carriers, in combination, a reciprocable bank of needles, actuating means therefor, means to start and stop the latter, and brake mechanism operatively associated with said actuating means, including a drum, opposed shoes movable into and out of braking relation therewith, spring means to move the shoes into braking relation, a spreader means and cooperating means on the shoes adjustably to separate the latter or to release them for application by the spring means, and cam and lever connections between the spreader and the starting and stopping means.

21. In mechanism for threading a yarn carrier, a carrier support, a reciprocable bank of needles, a holder for a yarn comb wherein the yarn ends to be threaded are held in spaced relation, said comb holder being movable transversely of the needles to engage the yarns therewith, means so to move the comb holder and engageable with a fixed part, and adjustable stop means on the holder accurately and variably to determine its yarn-presenting position in its plane of movement with respect to the needle paths.

22. In mechanism for threading yarn carriers, in combination, a frame, a bank of reciprocable needles thereon, opposed rotatable cups for receiving the ends of a yarn spool to be drawn upon, one of said cups having a socket for a spool journal, said socket being rotatably supported with respect to its cup and having associated means to hold it against turning in one selected direction relative to the cup, said means being reversible to hold in the opposite direction when desired.

23. In mechanism for threading yarn carriers, in combination, a frame, a bank of reciprocable needles thereon, opposed rotatable cups for receiving the ends of a yarn spool to be drawn upon, one of said cups having a socket for non-rotatively receiving a spool journal, said socket being itself rotatably supported within its cup, and means to hold said socket against turning in its cup in one or the opposite direction as selected.

24. In a machine for threading yarn carriers, in combination, a series of reciprocable hooked needles, a support for a yarn carrier to be threaded, means to hold a carrier on said support in position for passage of the needles through the yarn-receiving portions thereof, and means 27 on the machine immediately forwardly of and above the yarn-receiving portions of a positioned carrier and cooperable with a misaligned needle to prevent its hook from engaging over a wall of the corresponding yarn-receiving portion during retraction of the needles.

25. The method of threading a yarn carrier of the barrier or Servian loom type which comprises supporting the carrier in the vertical direction, longitudinally positioning the carrier against undesired lengthwise movement, further positioning the carrier by clamping engagement thereof at longitudinally spaced points along its face which is to be crossed by the yarns, additionally individually positioning the barriers of the carrier against undesired individual movement and misalignment thereof lengthwise the carrier, presenting at one side of the carrier a series of yarns in individually aligned positions relative to the inter-barrier spaces, and threading the yarns across through the inter-barrier spaces while so supporting and positioning the carrier and its barriers.

EDGAR F. HATHAWAY.
WALTER BIXBY.

CERTIFICATE OF CORRECTION.

Patent No. 1,941,086.                                December 26, 1933.

EDGAR F. HATHAWAY, ET AL.

It is hereby certified that error appears in the printed specification of the above numbered patent requiring correction as follows: Page 8, line 70, claim 20, strike out the article "a"; and lines 87-88, claim 21, strike out the words "and engageable with a fixed part" and insert the same after "holder" in line 89, of said claim; and that the said Letters Patent should be read with these corrections therein that the same may conform to the record of the case in the Patent Office.

Signed and sealed this 30th day of January, A. D. 1934.

F. M. Hopkins (Seal)                                Acting Commissioner of Patents.